US012571243B2

(12) United States Patent
Giovannetti

(10) Patent No.: US 12,571,243 B2
(45) Date of Patent: Mar. 10, 2026

(54) LIFT-UP DOOR OPENING DEVICE

(71) Applicant: Guangdong Tutti Hardware Co., Ltd, Foshan (CN)

(72) Inventor: Antonio Giovannetti, Milan (IT)

(73) Assignee: Guangdong Tutti Hardware Co., Ltd, Foshan (CN)

( * ) Notice: Subject to any disclaimer, the term of this patent is extended or adjusted under 35 U.S.C. 154(b) by 84 days.

(21) Appl. No.: 18/592,631

(22) Filed: Mar. 1, 2024

(65) Prior Publication Data

US 2024/0200382 A1 Jun. 20, 2024

Related U.S. Application Data

(63) Continuation of application No. PCT/EP2022/075429, filed on Sep. 13, 2022.

(30) Foreign Application Priority Data

Oct. 11, 2021 (IT) ........................ 102021000025982

(51) Int. Cl.
*E05F 1/12* (2006.01)
*E05F 3/20* (2006.01)

(52) U.S. Cl.
CPC .............. *E05F 1/1261* (2013.01); *E05F 3/20* (2013.01); *E05Y 2201/624* (2013.01); *E05Y 2900/20* (2013.01)

(58) Field of Classification Search
CPC ......... E05F 1/1261; E05F 3/20; E05F 1/1058; E05D 15/401; E05Y 2201/638; E05Y 2201/624
See application file for complete search history.

(56) References Cited

U.S. PATENT DOCUMENTS 967,230 A * 8/1910 Packer ...................... E05D 3/18 126/194
5,904,411 A * 5/1999 Hayakawa ............ E05D 15/582 49/386
(Continued)

FOREIGN PATENT DOCUMENTS

EP 2924215 A1 9/2015
EP 3219244 B1 * 12/2021 ............... E05D 3/18
(Continued)

OTHER PUBLICATIONS

International Search Report of PCT Patent Application No. PCT/EP2022/075429 issued on Jan. 9, 2023.

*Primary Examiner* — Jeffrey O'Brien

(57) ABSTRACT

Device for lift-up opening of a door of any furniture item in general, comprising a container that can be attached to the frame of the furniture item, more particularly to one of its sides, containing in its interior a mechanism that acts, by means of an arm, articulated to the container around a fulcrum pin, directly or indirectly on the door, wherein said arm carries an eccentric pin housed in an opening with curved profile formed in the container, and designed to engage with a cam profile of a plate slidably housed in the container, under the action of said at least one spring acting between said container and said plate in a direction opposite to said cam profile, said cam profile and the action of said at least one spring balancing the weight of the door in each position during opening and closure.

12 Claims, 8 Drawing Sheets

(56) References Cited

U.S. PATENT DOCUMENTS

| | | | | |
|---|---|---|---|---|
| 7,178,202 | B2 * | 2/2007 | Hirtsiefer | E05D 15/46 16/366 |
| 7,243,396 | B2 * | 7/2007 | Vanini | E05F 1/1058 16/286 |
| 7,707,687 | B2 * | 5/2010 | Giovannetti | E05D 15/262 312/328 |
| 8,533,914 | B2 * | 9/2013 | Vanini | E05F 5/02 16/50 |
| 8,707,519 | B2 * | 4/2014 | Elkasevic | E05F 1/1261 16/286 |
| 8,806,718 | B2 * | 8/2014 | Elkasevic | E05F 1/1261 16/286 |
| 8,959,709 | B2 * | 2/2015 | Hasegawa | E05F 5/00 16/50 |
| 9,316,036 | B2 * | 4/2016 | Collene | E05F 5/08 |
| 9,903,145 | B2 * | 2/2018 | Huber | E05F 1/105 |
| 10,244,920 | B2 * | 4/2019 | Vanini | E05D 3/14 |
| 10,745,953 | B2 * | 8/2020 | Xu | E05F 1/105 |
| 10,927,577 | B2 * | 2/2021 | Kruedener | E05D 5/0276 |
| 11,525,295 | B2 * | 12/2022 | Nordieker | E05D 3/16 |
| 11,549,297 | B2 * | 1/2023 | Giovannetti | E05F 1/1058 |
| 11,603,687 | B2 * | 3/2023 | Giovannetti | E05F 5/02 |
| 11,629,542 | B2 * | 4/2023 | Lee | E05D 3/18 16/304 |
| 12,037,825 | B2 * | 7/2024 | Boesch | E05F 1/1261 |
| 12,359,482 | B2 * | 7/2025 | Holzapfel | E05F 5/02 |
| 2003/0172920 | A1 * | 9/2003 | Gronbach | E05F 1/1261 126/197 |
| 2023/0018847 | A1 * | 1/2023 | Keck | E05D 3/06 |
| 2023/0272648 | A1 * | 8/2023 | Baldreich | E05D 3/00 312/325 |
| 2023/0272655 | A1 * | 8/2023 | Baldreich | E05D 15/40 49/381 |

FOREIGN PATENT DOCUMENTS

| | | | | |
|---|---|---|---|---|
| WO | 2003097973 | A1 | 11/2003 | |
| WO | 2018192718 | A1 | 10/2018 | |
| WO | WO-2023232308 | A1 * | 12/2023 | E05F 1/1058 |

* cited by examiner

LIFT-UP DOOR OPENING DEVICE

CROSS-REFERENCE TO RELATED APPLICATIONS

The present application is a Continuation Application of PCT Application No. PCT/EP2022/075429 filed on Sep. 13, 2022, which claims priority of Italian Patent Application No. 102021000025982 filed on Oct. 11, 2021. All the above are hereby incorporated by reference in their entirety.

FIELD

The present invention relates to a device for opening lift-up doors of a furniture item for the kitchen, bathroom, living area or of any item of furniture in general.

BACKGROUND

In the present context, a lift-up door opening device is understood to be any of the following examples:

- upward flap opening: the door is hinged to the top of the furniture item, as shown in the appended FIG. 1*a;*
- vertical opening: the door translates vertically, as shown in FIG. 1*b;*
- pivoting opening: the door rotates-translates vertically, as shown in FIG. 1*c;*
- packet opening: a pair of doors rotate-translate together vertically, as shown in FIG. 1*d.*

Various devices are known for the lifting of doors of furniture items of the different types given above. These devices are capable of balancing the weight in each position that the door assumes during opening as a result of the user's action, without the door going to occupy its position of maximum opening (or closure) when this action is interrupted.

In addition to the undoubted ergonomic advantages of not forcing the user to close the door from its maximum opening position, these devices also offer the fact of having the characteristic of perfectly balancing the weight of the door in every position. Therefore, the weight perceived by the user is practically zero, thus giving the sensation of lightness and ease of use.

Mechanisms that meet this requirement have the disadvantage of having large overall dimensions inside the storage compartment, thus occupying spaces that are useful for the effective use of an item of furniture. This is due substantially to the need to guide and keep inside their seats the elastic elements assigned to produce the energy for balancing the weight of the door.

In the prior art, these devices, in addition to having specific cases for containing the elastic elements, have further containers designed to contain the device components and therefore, also the cases themselves. This inevitably leads to an increase in the overall dimension of the device, which is in contrast with the current trend of concealing the mechanics required for movement of the doors, dictated by design reasons.

EP 2924215 A1 discloses a door opening and closing device includes: a main body attached to a housing; a mounting member attached to a door; an arm pivotably provided to the main body, the arm applying force to the door via the mounting member in an opening direction and/or a closing direction; a slider provided to the main body so as to be slidable in one direction; an urging means for urging the slider in the one direction; a transmission mechanism for transmitting urging force of the urging means to the arm; and a door restraint link pivotably linked to the arm at a position away from the center of pivot of the arm, pivotably linked to the mounting member, and slidably linked to the main body.

WO2018/192718 discloses a mechanism for moving a furniture door, apt to be placed on a lateral side of the piece of furniture and to move a door by means of a system of levers, said mechanism comprising a spring unit acting on said system of levers to balance the weight force of the door during opening, wherein said spring unit is pivotally mounted and acts directly on a main or thrust lever, mounted rotating around an axis, by means of a pin housed in a first cam slot formed in the lever and in a second cam slot placed in a fixed position with respect to the lateral side of the piece of furniture.

SUMMARY

The object of the present invention to provide a device for opening lift-up doors that eliminates the disadvantages of the mechanisms of the prior art disclosed above.

More particularly, an object of the invention is to propose such a device that has a reduced overall thickness dimension such as to occupy a minimum space inside the item of furniture, and therefore be almost hidden in the interior of the side.

A further object of the invention is to provide such a device that ensures the balancing of the weight of the door in every position, both when opening and closing, and that avoids a sudden jerk during opening and provides a cushioning effect during closure.

A further object of the invention is to provide such a device that is simple and inexpensive to manufacture and easy to assemble and mount.

Yet another object of the invention is to provide a device for opening lift-up doors that can be used in all of the types of doors previously mentioned: upward flap opening, vertical opening, pivoting opening, packet opening.

These and other objects of the invention are achieved with the features of the appended independent claim 1.

Advantageous embodiments of the invention are disclosed by the dependent claims.

Substantially, the device for lift-up opening of a door of an item of furniture according to the invention comprises a container that can be attached to the frame of the furniture item, in particular to one of the sides thereof, containing in its interior a mechanism that acts, by means of an arm, articulated to the container around a fulcrum pin, directly or indirectly on the door, wherein said arm carries an eccentric pin housed in a curved profile opening formed in the container, and capable of engaging with a cam profile of a plate slidably housed in the container, under the action of at least one spring acting between said container and said plate in the opposite direction to said cam profile, said cam profile and the action of said one at least spring balancing the weight of the door in each position during opening and closure.

BRIEF DESCRIPTION OF THE DRAWINGS

Further features of the invention will be made clearer by the following detailed description, referring to one of its embodiments purely by way of a non-limiting example, illustrated in the accompanying drawings, in which.

DETAILED DESCRIPTION OF THE EMBODIMENTS

Figure 1A:
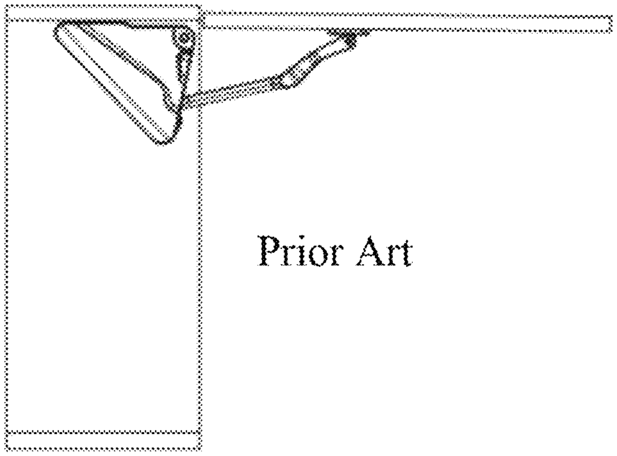
Prior Art Fig. 1a
FIGS. 1*a*-1*d* schematically illustrate various types of lift-up doors to which the opening device according to the invention can be applied.
Figure 1B:
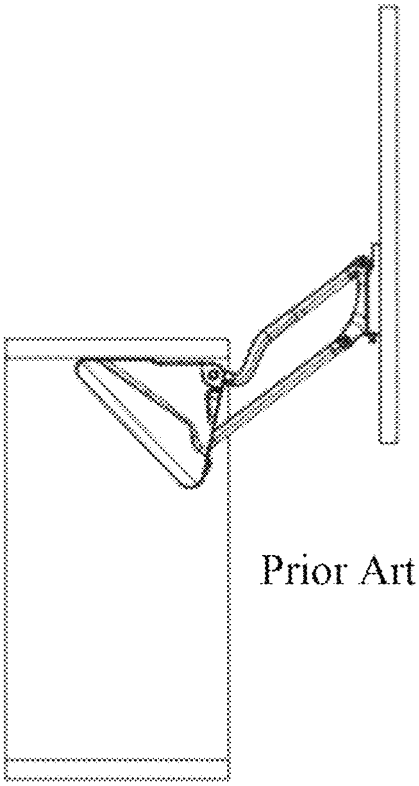
Prior Art Fig. 1b
Figure 1C:
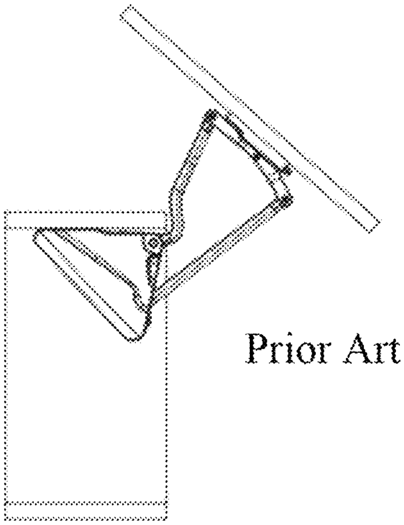
Prior Art Fig. 1c
Figure 1D:
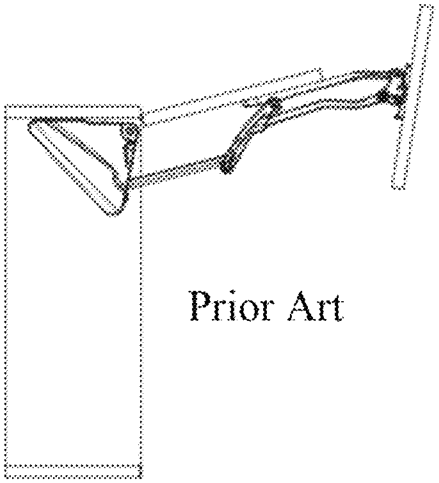
Prior Art Fig. 1d
Figure 2:
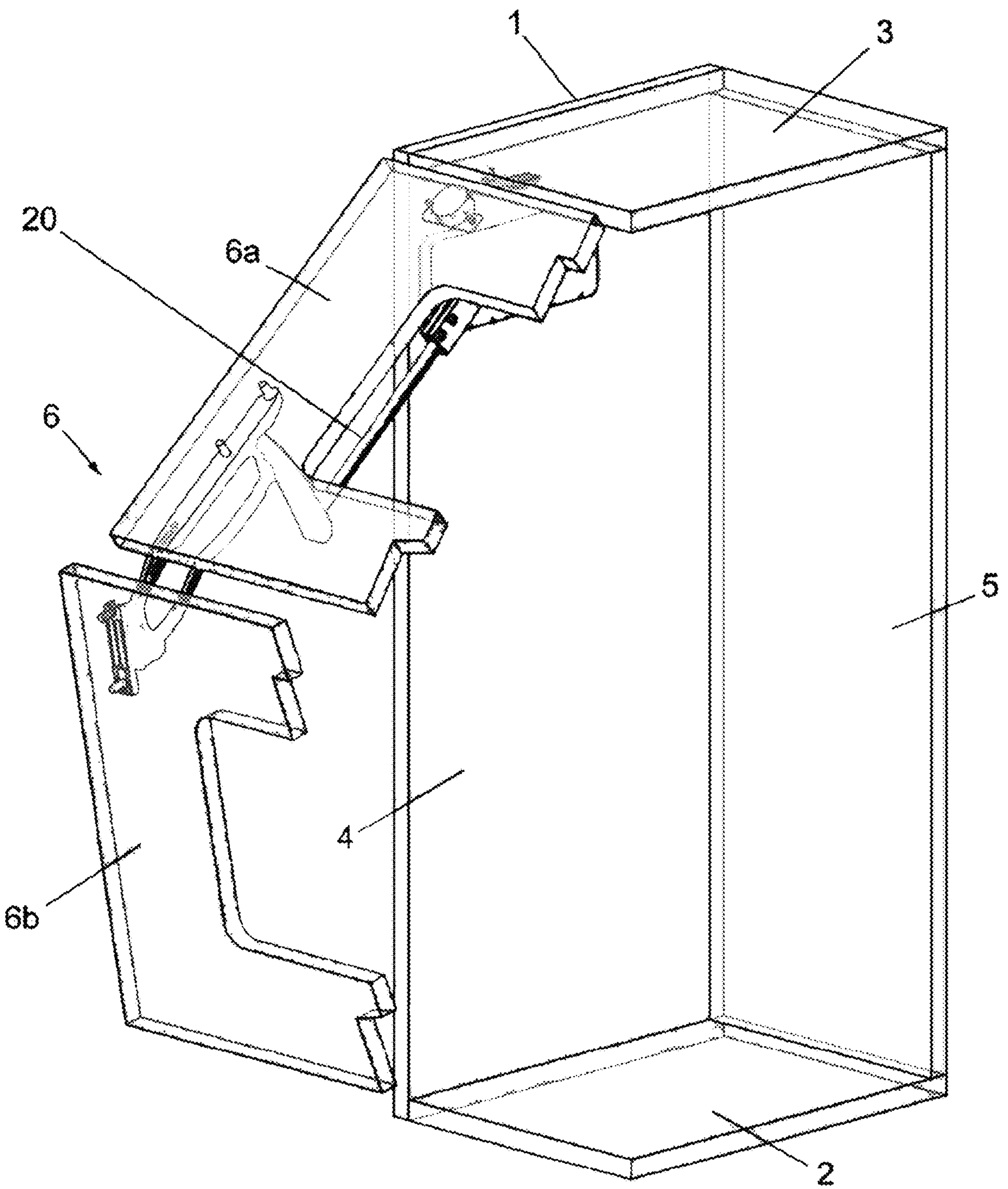
FIG. 2 is a partial axonometric view, with parts removed and parts shown in transparency, of an item of furniture with a packet-opening door, provided with a device according to the invention shown in an intermediate opening condition of the door.
Figure 3:
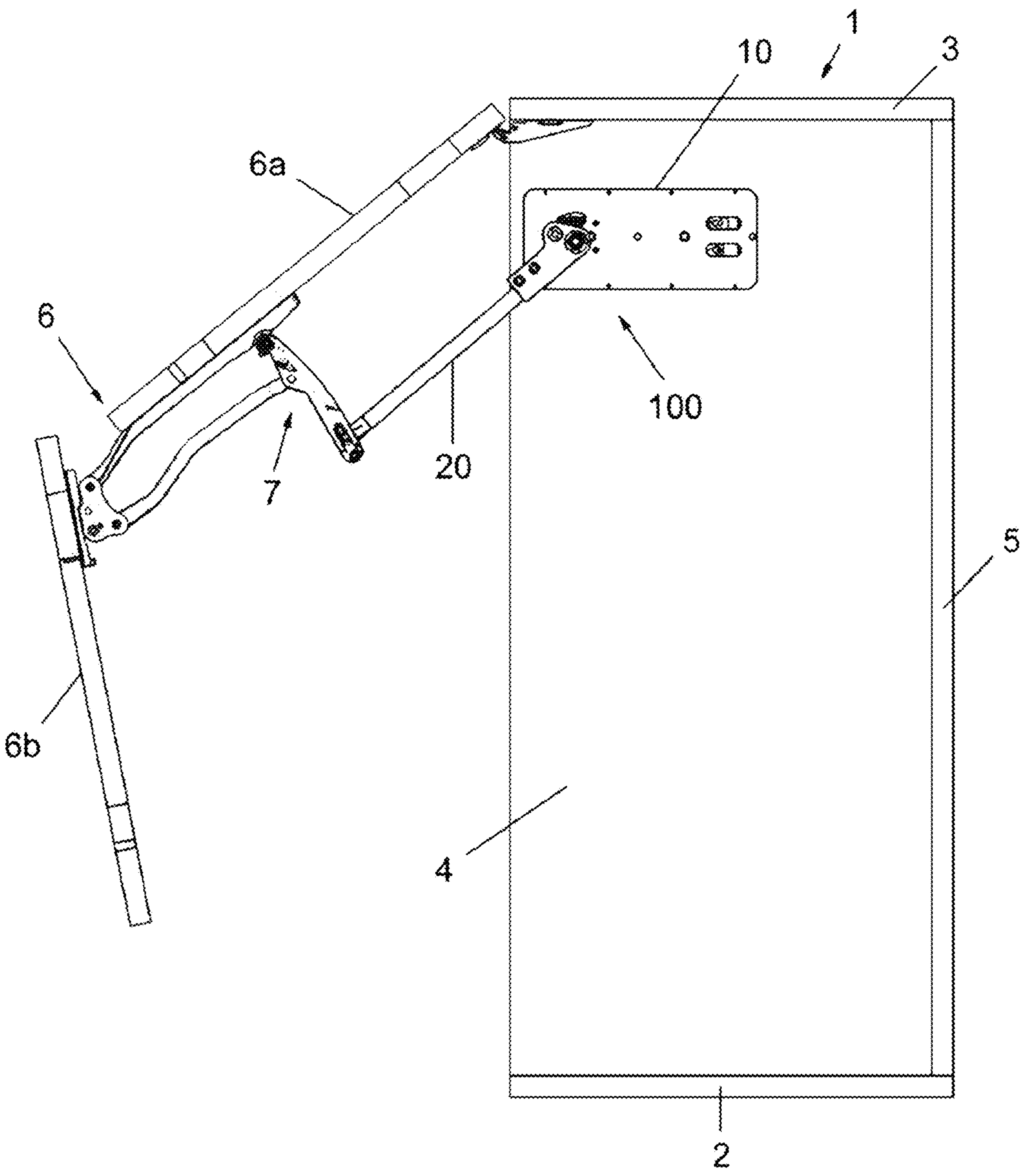
FIG. 3 is a side profile view of the furniture item of FIG. 2.

In FIGS. 2 and 3, solely by way of example, the device according to the invention is applied to an item of furniture with a packet lift-up door, of the type shown in FIG. 1*d*, it being understood that it can be used, without substantial modifications, for the opening of doors with a different lifting mode, as shown, for example, in FIGS. 1*a*-1*c*.

Referring to FIGS. 2 and 3, therein is illustrated an item of furniture, denoted overall by reference numeral 1, comprising a fixed frame made up of a lower wall or shelf 2, an upper wall or shelf 3, two side walls or sides 4, one of which is removed to show the device according to the invention, denoted by reference numeral 100, and a possible back wall 5. The furniture item 1 has a door 6 at the front, which in the present case is divided into two half-doors, an upper half-door 6*a* and a lower half-door 6*b*. The upper half-door 6*a* is pivoted to the upper shelf 3 of the furniture item, and the two half-doors are articulated one to the other by means of a lever mechanism 7, the whole substantially in itself known and therefore not described further.

The device 100 according to the invention, illustrated more clearly in FIGS. 4 to 9, serves to balance the weight of the door 6 in any position during the opening and closing movement, and comprises a box container 10 containing a mechanism that acts on the door via an arm 20, articulated to the lever mechanism 7, or directly to the door.

The container 10 is fixed to the frame of the furniture item 1, in this case to a side wall or side 4, and comprises two suitably shaped half-shells, substantially identical one to the other, which, for convenience only, will be called base 11 and cover 12, between which the various components of the mechanism are housed, and to which the arm 20 is pivoted.

Figure 4:
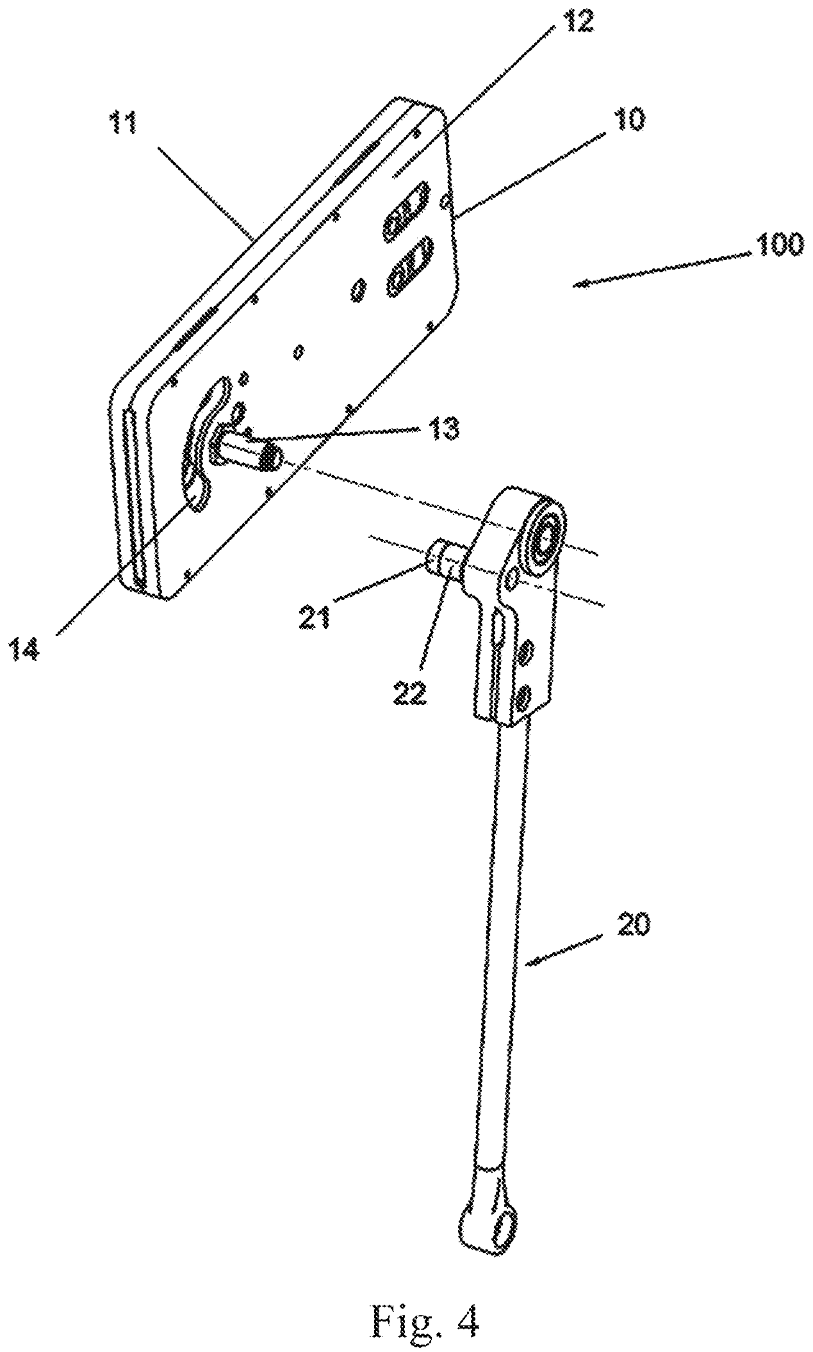
FIG. 4 is an axonometric view showing the container or containment shell of the mechanism of the device according to the invention and the arm for actuation of the door.

More particularly, referring to FIG. 4, the arm 20 is mounted in such a way as to be able to rotate freely around a pin 13 fixed to the container 10, and carries a pin 21 with a roller 22 which is housed in a curved profile opening 14, formed in the container 10, and which is capable of receiving the force necessary to support the door, as will be described in greater detail here below.

Figure 5:
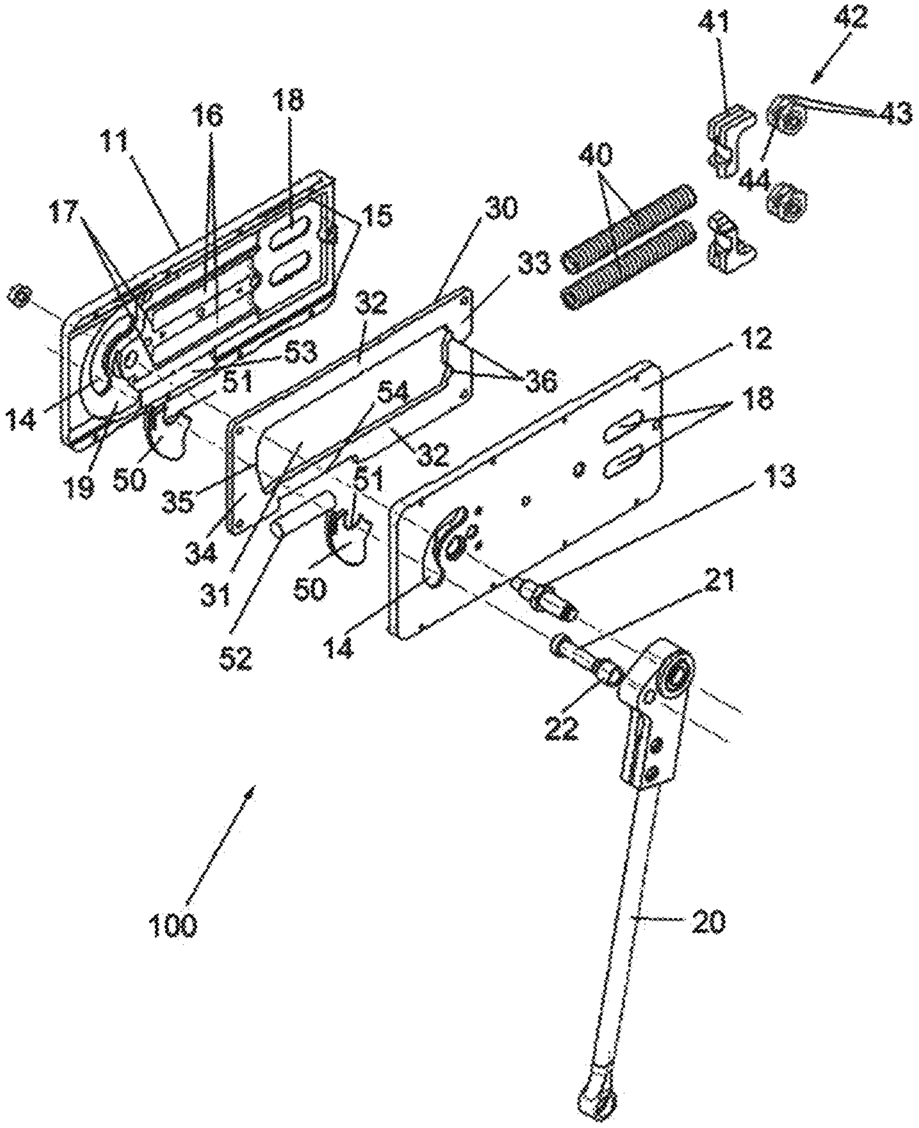
FIG. 5 is a blown-up view of the components of FIG. 4.

Referring to the blown-up view of FIG. 5, between the two half-shells 11, 12 a plate 30 is arranged, in the shape of a rectangular frame, having a large window 31, delimited by two longer horizontal sides (with reference to the arrangement of FIG. 4) 32, that are slidably housed in corresponding longitudinal guides 15 of the container 10, and by two shorter vertical sides 33, 34, arranged respectively at the rear and the front part of the container 10, when viewed from the front part of the furniture item.

The front side 34 of the plate 30 has a thickness increasing from the top downwards, so as to determine internally a cam profile 35, which delimits the window 31 at the front.

The pin 21 of the arm 20, passing through the opening 14 of the container 10, goes to interact, via the roller 22, with the cam profile 35 formed on the plate 30, as will be described in greater detail here below.

A pair of springs 40 are arranged in the window 31 of the plate 30, which are housed in respective seats 16 formed internally to the two half-shells 11, 12.

The springs 40 act on the one hand against abutments 17 provided in the half-shells, at the front end of the seats 16, and on the other hand against the rear side 33 of the plate 30, by means of abutments 41 and devices 42 for regulation of the preload of the springs.

Each device 42 has a pair of hexagonal nuts 43, appropriately distanced one from the other, arranged on an eccentric shaft 44 housed in a corresponding seat 36 provided inside the side 33 of the plate 30, which constitutes the center of rotation thereof. One of the faces of the nuts 43 is arranged against the abutment 41, on the opposite side with respect to the end of the corresponding spring 40. Since the faces of the hexagonal nuts are at a different distance from the eccentric shaft 44, they restrain the spring 40 at different preloads depending on the orientation of the device 42 with respect to the plate 30. The ends of the eccentric shaft 44 are housed in corresponding longitudinal slots 18 provided in the half-shells 11, 12, and have holes for rotational actuation by means of an appropriate key.

Once the orientation of the preload adjusting devices 42 has been selected, the springs 40 act from the abutments 17, fixed, to the abutments 41 made integral with the plate 30 which, as mentioned, translates along the longitudinal guides 15 in one direction and in the other, causing the compression/distension of the springs 40.

The plate 30, undergoing the action of the springs 40, slides along the guides 15 until the particular cam profile 35 meets the pin 21 of the arm 20 causing rotation thereof around the pin 13. During the rotation of the arm 20, the roller 22 rolls along the cam profile 35, therefore the plate 30, through the action of the springs 40 and the appropriate shape of the cam profile 35 imparts on the arm 20 a torque that varies according to the position taken up by the roller 22.

The cam profile 35 is designed in such a way as to give perfect balancing of the door in all its positions along the arc of opening in such a way that if the action by the user is interrupted the door is balanced and does not continue its stroke until complete opening. The same takes place during the phase of closure.

Figure 6:
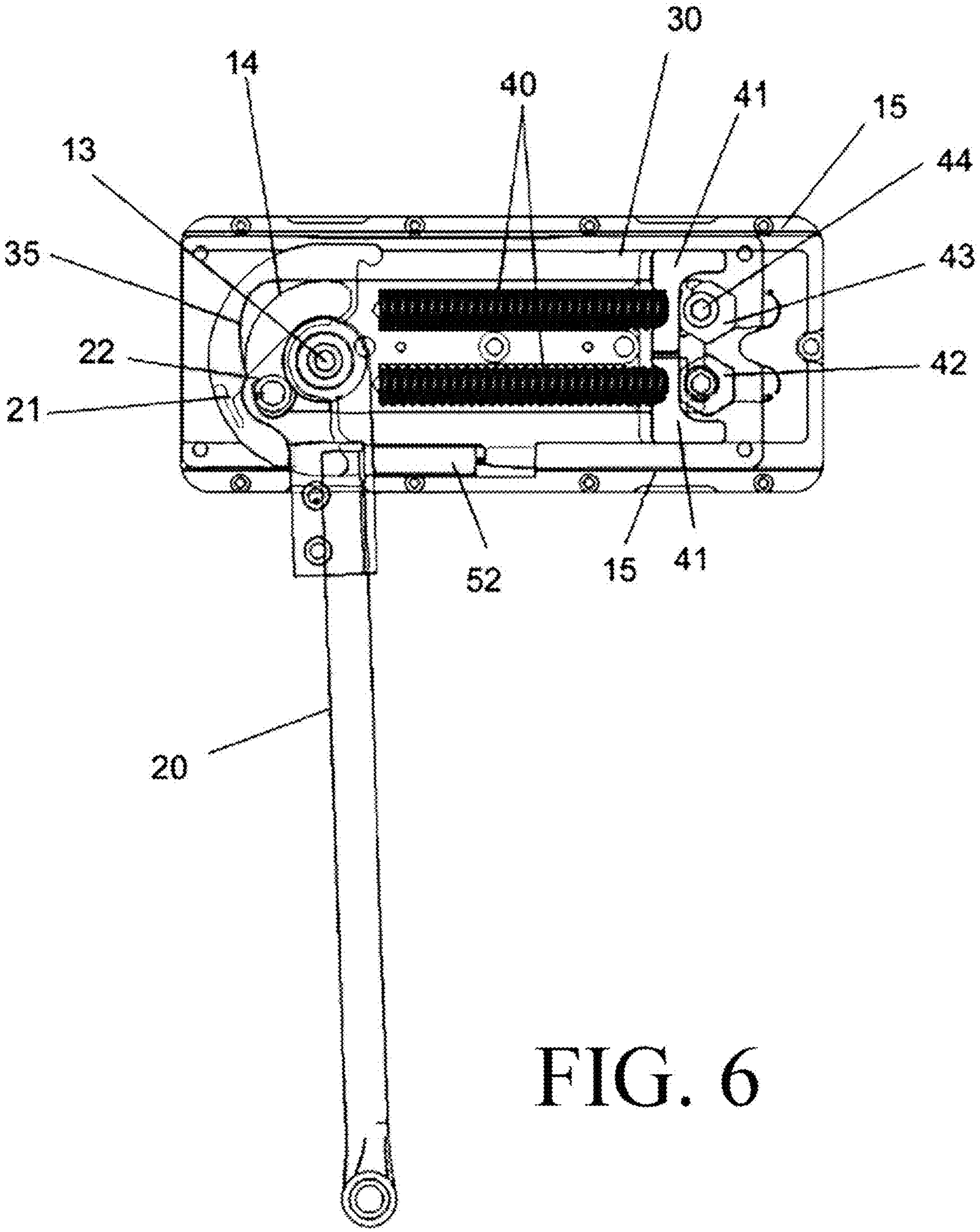
FIGS. 6, 7, 8 are plan views of the container of the mechanism of the device according to the invention, without cover and with parts in transparency to better show the position of the various elements, in the conditions of door fully closed, partially open and completely open, respectively.
Figure 7:
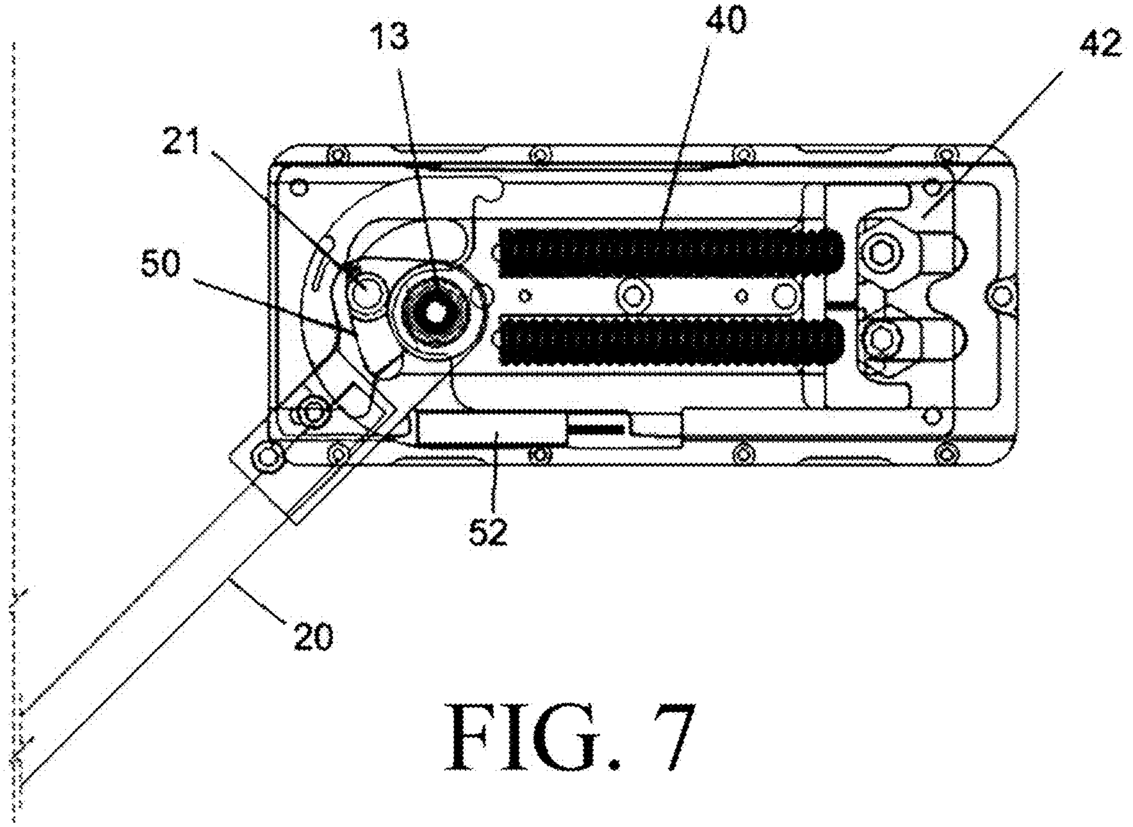
Figure 8:
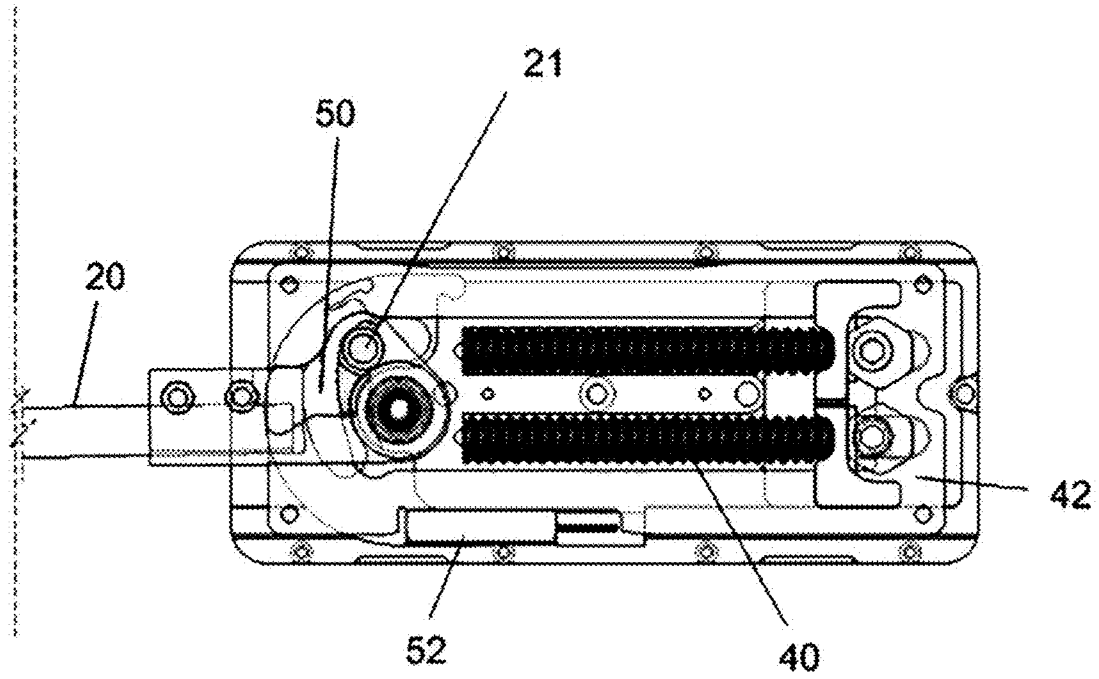

FIGS. 6 to 8 show a sequence of configurations of the device according to the invention, starting from the condition of fully closed door to that of door fully open, in which the container 10 of the movement mechanism is shown without the half-shell or cover 12 and with parts in transparency to better show the position of the various elements.

FIG. 6 shows the device in the condition of closed door, in which the springs 40 are in a compressed condition, determined by the interference of the roller 22 of the pin 21 with the lower section of the cam profile 35, i.e. the thicker part of the front side 34 of the plate 30.

Starting from this condition, a rotation of the arm 20 in clockwise direction, corresponding to the direction of opening of the door, produces the sliding of the roller 22 of the pin 21 along the cam profile 35 of the plate 30, moving to the less thick section of the side 34, and allowing the plate 30 to move to the right under the action of the springs 40 which tend to distend.

As mentioned, the cam profile 35 and the calibration of the springs 40 are such as to balance the weight of the door in any position it occupies during opening.

FIG. 7 shows the arrangement of the mechanism in a condition of partially open door, and FIG. 8 in the condition of fully open door, in which the springs 40 are in the condition of maximum distension, established by the preload devices 42.

The closure of the door, starting from the condition of FIG. 8, causes a rotation anticlockwise of the arm 20, with a path of the roller 22 inverse to the previous one, until it reaches the configuration of FIG. 6.

Figure 9:
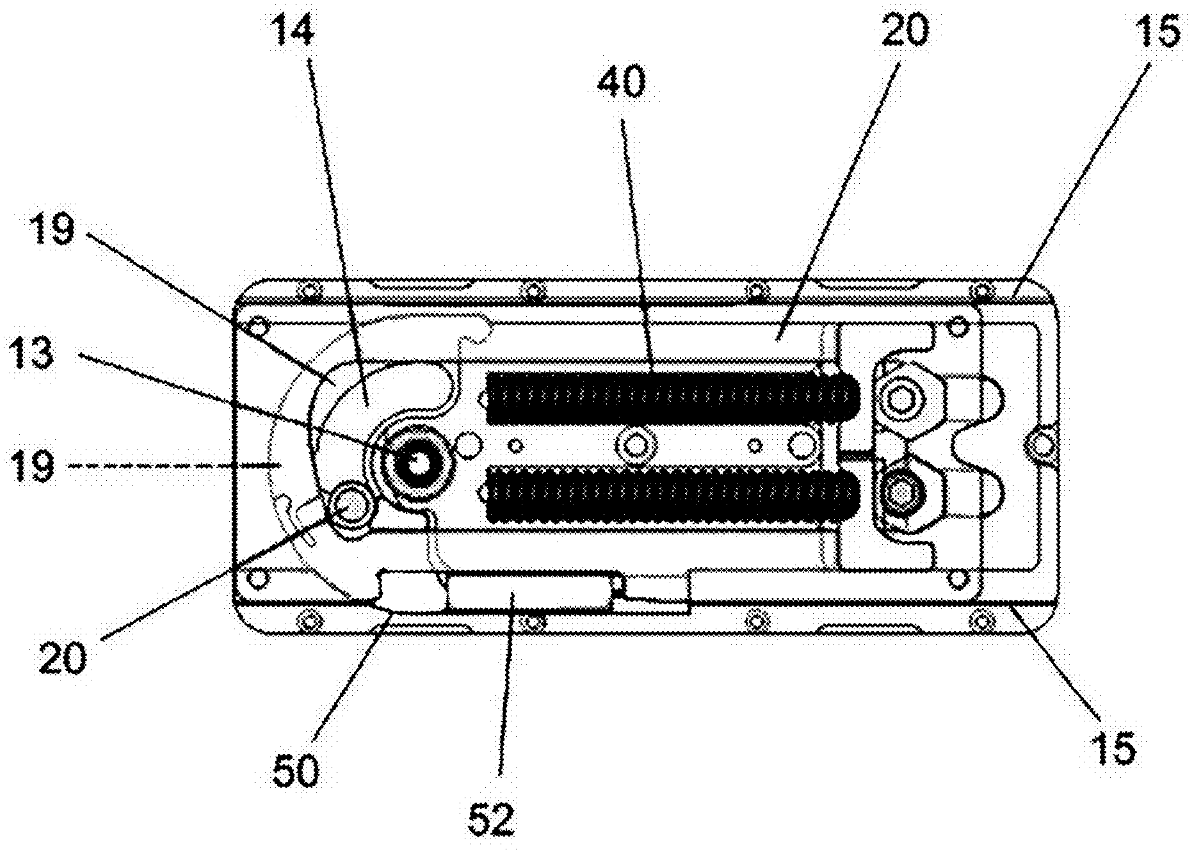
FIG. 9 is a view like FIG. 6, without the arm for actuation of the door, to highlight the damping during closure.

The closure of the door takes place in a damped manner, as will now be described with particular reference to FIGS. 5 and 9.

Inside the half-shells 11, 12 opposing arcuate housings 19 are provided (only one can be seen in FIG. 5, and partially in transparency in the others), arranged around the openings 14, in which respective arcuate plates 50, which reproduce the curved profile thereof, are housed.

The plates 50 sandwich the sliding plate 30 and have respective cavities 51, designed to accommodate the pin 21 and to be driven by it along the profile of the curved seats 19 during the rotation of the arm 20.

During the final phase of closure of the door, the plates 50 compress a damper 52 housed between opposing seats 53 of the half-shells 11, 12 and in a lower recess 54 of the plate 30, producing the damping of the door.

From what has been disclosed, the advantages of the device of the invention appear clear, whose components, rather than being arranged in a case, in turn arranged in an external container, as is the case in the prior art, are arranged directly in the container which, suitably shaped, itself acts as guide and container for the elastic elements assigned to the lifting of the door. In this way the overall dimensions of the device are considerably reduced, which can be concealed inside the side of the furniture item.

In the foregoing, the container 10 has been described as being realized in two half shells, although it could theoretically be realized as a single shell.

Naturally the invention is not limited to the particular embodiment described above and illustrated in the accompanying drawings, but numerous detailed changes can be made thereto within the reach of the person skilled in the art, without thereby departing from the scope of the invention as defined in the appended claims.

The invention claimed is:

1. Device for lift-up opening of a door of a kitchen, bathroom, living area furniture item, comprising a container that is configured to be attached to one side of a frame of the furniture item, containing in an interior of the container a mechanism that acts, by means of an arm, articulated to the container around a fulcrum pin, directly or indirectly on the door, wherein the mechanism comprises an eccentric pin, a plate, and at least one spring, the arm carries the eccentric pin housed in an opening with curved profile, formed in the container, and configured to engage with a cam profile of the plate slidably housed in the container, under an action of the at least one spring acting between the container and the plate in a direction opposite to the cam profile, the cam profile and the action of the at least one spring balancing a weight of the door in each position during opening and closure, wherein the plate is in a shape of a rectangular frame, having a large window, delimited by two horizontal sides slidably housed in corresponding longitudinal guides of the container, and by two vertical sides, wherein one of the two vertical sides has a variable thickness, in such a way as to determine internally the cam profile on one side, the cam profile delimiting the window.

2. Device according to claim 1, characterized in that each of the at least one spring is arranged in the window of the plate, is housed in a seat formed internally to the container and acts on the other vertical side of the plate by means of a corresponding abutment and a corresponding regulating device configured to preload the spring, wherein the regulating device comprises a pair of hexagonal nuts distanced one from the other, the pair of hexagonal nuts is arranged on an eccentric shaft provided inside the plate.

3. Device according to claim 2, characterized in that the regulating device is housed in a corresponding longitudinal slot provided in the container, in such a way as to be accessible from both sides, and has a hole for rotational actuation by means of key.

4. Device according to claim 1, characterized in that an arcuate seat is provided inside the container, arranged around the opening, in which an arcuate plate is housed that reproduces the curved profile thereof and has a cavity, configured to house the eccentric pin and to be driven by the eccentric pin along a profile of the arcuate seat during a rotation of the arm, during a final phase of closure of the door, the arcuate plate compressing a damper housed in a seat of the container and in a lower recess of the plate, producing a damping of the door.

5. Device according to claim 2, characterized in that an arcuate seat is provided inside the container, arranged around the opening, in which an arcuate plate is housed that reproduces the curved profile thereof and has a cavity, configured to house the eccentric pin and to be driven by the eccentric pin along a profile of the arcuate seat during a rotation of the arm, during a final phase of closure of the door, the arcuate plate compressing a damper housed in a seat of the container and in a lower recess of the plate, producing a damping of the door.

6. Device according to claim 3, characterized in that an arcuate seat is provided inside the container, arranged around the opening, in which an arcuate plate is housed that reproduces the curved profile thereof and has a cavity, configured to house the eccentric pin and to be driven by the eccentric pin along a profile of the arcuate seat during a rotation of the arm, during a final phase of closure of the door, the arcuate plate compressing a damper housed in a seat of the container and in a lower recess of the plate, producing a damping of the door.

7. Device according to claim 4, characterized in that the container is made in two identical half-shells.

8. Device according to claim 5, characterized in that the container is made in two identical half-shells.

9. Device according to claim 6, characterized in that the container is made in two identical half-shells.

10. Device according to claim 7, characterized in that the door is made in two half-doors.

11. Device according to claim 8, characterized in that the door is made in two half-doors.

12. Device according to claim 9, characterized in that the door is made in two half-doors.

* * * * *